United States Patent
Suzuki

(10) Patent No.: US 9,643,232 B2
(45) Date of Patent: May 9, 2017

(54) SERVO PRESS LINE OPERATION METHOD AND SERVO PRESS LINE OPERATION CONTROL DEVICE

(71) Applicant: AIDA ENGINEERING, LTD., Kanagawa (JP)

(72) Inventor: Satoshi Suzuki, Yokohama (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 160 days.

(21) Appl. No.: 14/290,649

(22) Filed: May 29, 2014

(65) Prior Publication Data

US 2014/0352381 A1 Dec. 4, 2014

(30) Foreign Application Priority Data

May 30, 2013 (JP) ................................ 2013-113948
Mar. 27, 2014 (JP) ................................ 2014-065727

(51) Int. Cl.
*B21D 43/02* (2006.01)
*B21D 55/00* (2006.01)
(Continued)

(52) U.S. Cl.
CPC ........... *B21D 43/025* (2013.01); *B21D 43/05* (2013.01); *B21D 55/00* (2013.01); *B21K 27/06* (2013.01);
(Continued)

(58) Field of Classification Search
CPC .... B21D 43/02; B21D 43/021; B21D 43/025; B21D 43/026; B21D 43/027; B21D 43/05;
(Continued)

(56) References Cited

U.S. PATENT DOCUMENTS 3,675,098 A 7/1972 Heiberger
3,728,597 A 4/1973 Cummens et al.
(Continued)

FOREIGN PATENT DOCUMENTS

DE 4225834 A1 2/1994
DE 112007002616 T5 10/2009
(Continued)

OTHER PUBLICATIONS

Notification of Reasons for Refusal Japanese Patent Application No. 2014-065727 dated May 13, 2015 with English translation.
European Search Report EP 14 00 1891 dated Oct. 21, 2014.

*Primary Examiner* — Peter DungBa Vo
*Assistant Examiner* — Joshua D Anderson
(74) *Attorney, Agent, or Firm* — McDermott Will & Emery LLP

(57) ABSTRACT

A servo press line operation method operates a servo press line in which a servo press and a servo transfer device are disposed in a workpiece transfer direction. The servo press line operation method includes causing a transfer controller to receive a master signal that causes the servo transfer device to make a motion in synchronization with the servo press, the transfer controller controlling a motor of the servo transfer device using a motor instruction, causing the transfer controller to determine whether or not an abnormality in the master signal has occurred, and causing the transfer controller to generate the motor instruction based on a stop signal that stops the motor of the servo transfer device, instead of the master signal, when the transfer controller has determined that an abnormality in the master signal has occurred.

4 Claims, 11 Drawing Sheets

(51) Int. Cl.
 *B21K 27/06* (2006.01)
 *B21D 43/05* (2006.01)
 *G05B 19/418* (2006.01)
 *B30B 15/28* (2006.01)

(52) U.S. Cl.
 CPC ...... *G05B 19/41815* (2013.01); *B30B 15/285* (2013.01); *G05B 2219/24208* (2013.01); *G05B 2219/34397* (2013.01); *G05B 2219/34452* (2013.01); *G05B 2219/39105* (2013.01); *G05B 2219/45142* (2013.01); *Y02P 90/08* (2015.11); *Y02P 90/087* (2015.11)

(58) Field of Classification Search
 CPC .. B21D 43/052; B21D 43/055; B21D 43/057; B21D 55/00; B21K 27/00; B21K 27/02; B21K 27/04; B21K 27/06; B21K 31/00; B30B 15/14; B30B 15/142; B30B 15/146; B30B 15/148; B30B 15/26; B30B 15/285; B30B 15/30; G05B 19/0428; G05B 19/048; G05B 19/4061; G05B 19/4063; G05B 19/41815; G05B 19/4182; G05B 2219/24208; G05B 2219/24211; G05B 2219/34397; G05B 2219/34452; G05B 2219/39097; G05B 2219/39098; G05B 2219/39102; G05B 2219/39105; G05B 2219/39143; G05B 2219/42215; G05B 2219/45142; G05B 2219/49161; G05B 2219/50082; Y02P 90/08; Y02P 90/087
 USPC ........ 72/1, 3, 4, 19.8, 20.2, 20.3, 20.5, 28.1, 72/29.2, 30.1, 187, 345, 346, 349, 405.01, 72/405.09, 405.1, 405.11–405.13
 See application file for complete search history.

(56) References Cited

U.S. PATENT DOCUMENTS

| | | | |
|---|---|---|---|
| 5,913,932 A | * | 6/1999 | Takayama ............ B30B 15/287 198/621.1 |
| 5,934,125 A | * | 8/1999 | Takayama ............ B21D 43/055 192/150 |
| 6,176,365 B1 | | 1/2001 | Klemm |
| 8,096,233 B2 | | 1/2012 | Kaneko |
| 2006/0029091 A1 | | 2/2006 | Meyer-Graefe et al. |
| 2012/0272839 A1 | | 11/2012 | Kaneko |

FOREIGN PATENT DOCUMENTS

| | | |
|---|---|---|
| JP | 10-175030 A | 6/1998 |
| JP | 2007-286727 A | 11/2007 |
| JP | 2008-137015 A | 6/2008 |
| JP | 2009-172662 A | 8/2009 |
| JP | 2009-285666 A | 12/2009 |
| JP | 2010-012511 A | 1/2010 |

* cited by examiner

SERVO PRESS LINE OPERATION METHOD AND SERVO PRESS LINE OPERATION CONTROL DEVICE

Japanese Patent Application No. 2013-113948, filed on May 30, 2013, and Japanese Patent Application No. 2014-065727, filed on Mar. 27, 2014, are hereby incorporated by reference in their entirety.

BACKGROUND OF THE INVENTION

The present invention relates to an operation method and an operation control device for a servo press line in which a servo press and a servo transfer device are alternately disposed in the workpiece transfer direction.

A servo press line has been known in which servo presses and servo transfer devices are alternately disposed in the workpiece transfer direction. The servo press presses a workpiece transferred from the upstream-side servo transfer device. The downstream-side servo transfer device transfers the pressed workpiece from the servo press. The upstream-side servo transfer device and the downstream-side servo transfer device respectively refer to the servo transfer device that is disposed adjacent to the servo press on the upstream side of the servo press in the workpiece transfer direction, and the servo transfer device that is disposed adjacent to the servo press on the downstream side of the servo press in the workpiece transfer direction. The workpiece is pressed by the servo press while being sequentially transferred by the servo transfer device in the downstream direction to obtain a product.

In this case, it is necessary to control the motion of the servo press (i.e., slide and die), the motion of the upstream-side servo transfer device, and the motion of the downstream-side servo transfer device so that the servo press, the upstream-side servo transfer device, and the downstream-side servo transfer device do not interfere with each other. For example, JP-A-2008-137015 discloses a technique that prevents interference by synchronizing the position of the slide of the servo press and the position of the servo transfer device with a master signal.

The servo press line is required to prevent interference even when an abnormality has occurred in the servo press or the servo transfer device. The technique disclosed in JP-A-2008-137015 decelerates or stops all of the servo presses and all of the servo transfer devices when an abnormality has occurred while maintaining synchronization by changing the rate of the master signal, or setting the rate of the master signal to 0.

JP-A-2009-285666 discloses a technique that supplies power through a bus that can supply regenerative power when a power failure has occurred. The technique disclosed in JP-A-2009-285666 decelerates or stops all of the servo presses and all of the servo transfer devices while maintaining synchronization by changing the rate of the master signal, or setting the rate of the master signal to 0, using the supplied power.

JP-A-2010-12511 discloses a technique that prevents interference by performing a correction control process when the motion of the servo press or the servo transfer device has advanced or delayed.

SUMMARY

The invention may provide a servo press line operation method and a servo press line operation control device that can reliably prevent interference even when an abnormality in the master signal has occurred.

According to a first aspect of the invention, there is provided a method for operating a servo press line in which a servo press and a servo transfer device are disposed in a workpiece transfer direction, the method including:

causing a transfer controller to receive a master signal that causes the servo transfer device to make a motion in synchronization with the servo press, the transfer controller controlling a motor of the servo transfer device using a motor instruction;

causing the transfer controller to determine whether or not an abnormality in the master signal has occurred; and causing the transfer controller to generate the motor instruction based on a stop signal that stops the motor of the servo transfer device, instead of the master signal, when the transfer controller has determined that an abnormality in the master signal has occurred.

According to a second aspect of the invention, there is provided an operation control device for a servo press line in which a servo press and first and second servo transfer devices are arranged along a workpiece transfer direction, the servo press is located between the first servo transfer device and the second servo transfer device, the operation control device including:

an abnormality detection section that receives a master signal by which the first and second servo transfer devices and the servo press are synchronized, and that detects an abnormality in the master signal; and a stop signal generation section that generates a stop signal which is different from the master signal and disables one of the first and second servo transfer devices, when the abnormality in the master signal has been detected.

DETAILED DESCRIPTION OF THE EMBODIMENT

According to one embodiment of the invention, there is provided a method for operating a servo press line in which a servo press and a servo transfer device are disposed in a workpiece transfer direction, the method including:

causing a transfer controller to receive a master signal that causes the servo transfer device to make a motion in synchronization with the servo press, the transfer controller controlling a motor of the servo transfer device using a motor instruction;

causing the transfer controller to determine whether or not an abnormality in the master signal has occurred; and causing the transfer controller to generate the motor instruction based on a stop signal that stops the motor of the servo transfer device, instead of the master signal, when the transfer controller has determined that an abnormality in the master signal has occurred.

According to the method for operating a servo press line, the motor instruction is generated based on the stop signal instead of the master signal when it has been determined that an abnormality in the master signal has occurred. Therefore, it is possible to prevent interference between the servo press and the servo transfer device even when an abnormality in the master signal has occurred.

According to one embodiment of the invention, there is provided an operation control device for a servo press line in which a servo press and first and second servo transfer devices are arranged along a workpiece transfer direction, the servo press is located between the first servo transfer device and the second servo transfer device, the operation control device including:

an abnormality detection section that receives a master signal by which the first and second servo transfer devices and the servo press are synchronized, and that detects an abnormality in the master signal; and a stop signal generation section that generates a stop signal which is different from the master signal and disables one of the first and second servo transfer devices, when the abnormality in the master signal has been detected.

According to the operation control device, the stop signal is generated from the stop signal generation section instead of the master signal when the abnormality in the master signal has been detected. Therefore, it is possible to prevent interference between the servo press and one of the first and second servo transfer devices or interference between the first and second servo transfer devices even when an abnormality in the master signal has occurred.

Exemplary embodiments of the invention are described in detail below with reference to the drawings. Note that the following exemplary embodiments do not unduly limit the scope of the invention as stated in the claims. Note also that all of the elements described below should not necessarily be taken as essential elements of the invention.

1. Overall Configuration of Servo Press Line

Figure 1:
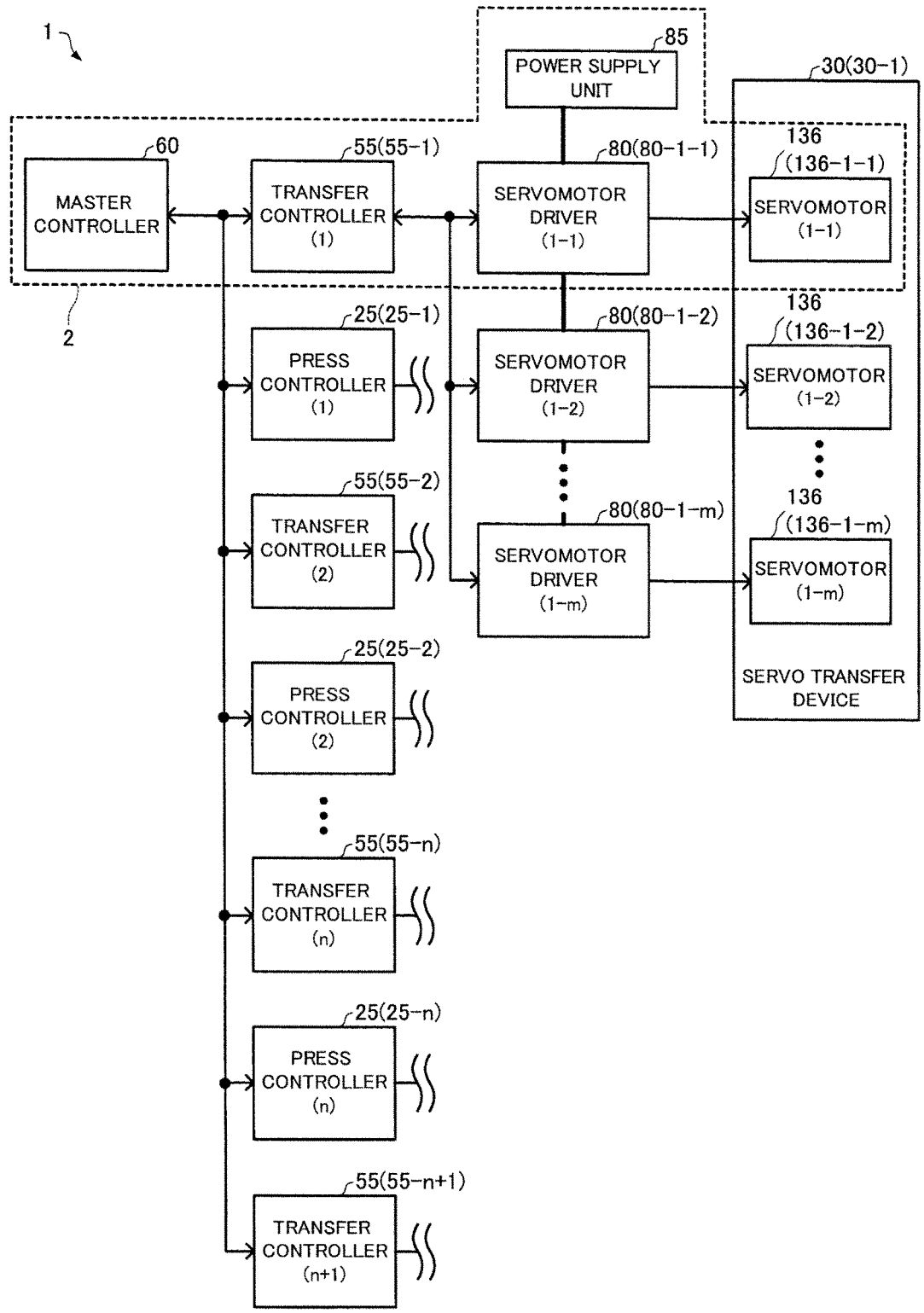
FIG. 1 is a block diagram illustrating the entire servo press line according to one embodiment of the invention.

An operation control device 3 (see FIG. 2) according to one embodiment of the invention forms part of a servo press line 1 illustrated in FIG. 1. The servo press line 1 includes a master controller 60, a transfer controller 55, a press controller 25, a power supply unit 85, a servomotor driver 80, and a servo transfer device 30. The servo press line 1 also includes a servo press 10 that is not illustrated in FIG. 1.

The servo press line 1 includes n+1 (n is an integer equal to or larger than 1) servo transfer devices 30 and n servo presses 10 (not illustrated in FIG. 1), the n+1 servo transfer devices 30 and the n servo presses 10 being alternately disposed in the transfer direction of a workpiece 35. The servo press line 1 includes n+1 transfer controllers 55 that respectively control the motion of the n+1 servo transfer devices 30. The n+1 transfer controllers 55 may be hereinafter referred to as transfer controllers 55-1, 55-2, . . . , 55-n, and 55-n+1.

In FIG. 1, "TRANSFER CONTROLLER (1)" to "TRANSFER CONTROLLER (n+1)" respectively correspond to the transfer controllers 55-1 to 55-n+1. In FIG. 1, the press controller, the servomotor driver, and the servomotor are illustrated in the same manner as the transfer controller. In the following description, the press controller 25, the servomotor driver 80, the servomotor 136, the servo transfer device 30, and the servo press 10 may respectively be referred to as "press controller 25-1", "servomotor driver 80-1", "servomotor 136-1", "servo transfer device 30-1", and "servo press 10-1", for example.

The servo press line 1 includes n press controllers 25 that respectively control the motion of the n servo presses 10.

The n+1 servo transfer devices 30 transfer the workpiece 35 (see FIG. 3) to or from the n servo presses 10. Therefore, it is necessary to synchronize the motion of the n servo presses 10 and the motion of the n+1 servo transfer devices 30 so that the servo press 10 does not interfere (collide) with the servo transfer device 30, and two servo transfer devices 30 situated on either side of the servo press 10 do not interfere with each other.

The master controller 60 supplies a single master signal to the n+1 transfer controllers 55 and the n press controllers 25 to synchronize the motion of the n+1 servo transfer devices 30 and the motion of the n servo presses 10. The master signal indicates an instruction angle of 0 to 360 (deg), for example. It is possible to synchronize the motion of the n+1 servo transfer devices 30 and the motion of the n servo presses 10 by specifying the motion of the n+1 servo transfer devices 30 and the motion of the n servo presses 10 using a function that utilizes the value (e.g., 90 (deg)) of the master signal as a parameter.

The n press controllers 25 that receive a common master signal for synchronization are controlled independently of each other. For example, the press controller 25-1 is controlled independently of the press controller 25-2. The n+1 transfer controllers 55 that receive a common master signal for implementing synchronization are controlled independently of each other. For example, the transfer controller 55-1 is controlled independently of the transfer controller 55-2.

As illustrated in FIG. 1, the servo transfer device 30 includes m (m is an integer equal to or larger than 1) servomotors 136. m servomotor drivers 80 respectively drive the m servomotors 136.

For example, the transfer controller 55-1 that has received the master signal generates a motor instruction based on the master signal, and outputs the motor instruction to the servomotor drivers 80-1-1, 80-1-2, . . . , and 80-1-m. The motor instruction may be an instruction that designates the strokes per minute, or may be an instruction that designates a stop time used when an abnormality that makes it impossible to perform a power-running operation has occurred.

The servomotor drivers 80-1-1, 80-1-2, . . . , and 80-1-$m$ respectively drive the servomotors 136-1-1, 136-1-2, . . . , and 136-1-$m$ according to the motor instruction received from the transfer controller 55-1. The transfer controller 55-1 thus controls the motion of the servo transfer device 30-1 based on the master signal received from the master controller 60.

The transfer controllers 55-2, . . . , 55-$n$, and 55-$n$+1 respectively control the motion of the servo transfer devices 30-2, . . . , 30-$n$, and 30-$n$+1 (not illustrated in FIG. 1) in the same manner as the transfer controller 55-1. Each of the n press controllers 25 drives one servomotor 136 or a plurality of servomotors 136 included in each of the n servo presses 10 according to the motor instruction. Specifically, each of the n press controllers 25 can control the motion of each of the n servo presses 10 based on the master signal received from the master controller 60.

The servo press line 1 is configured so that the servomotor driver 80 transmits a signal to the transfer controller 55, and the transfer controller 55 transmits a signal to the master controller 60.

The servomotor driver 80 receives power from the power supply unit 85. When one of the servomotor drivers 80 has detected an abnormality in the power supply voltage, the servomotor driver 80 notifies the transfer controller 55 (that has supplied the motor instruction) that an abnormality in the power supply voltage has occurred.

The transfer controller 55 that has been notified that an abnormality in the power supply voltage has occurred, notifies the master controller 60 of occurrence of the abnormality. The master controller 60 outputs a master signal that stops all of the servo transfer devices 30 and all of the servo presses 10. All of the servo transfer devices 30 and all of the servo presses 10 stop operation in synchronization in response to the master signal (hereinafter may be referred to as "stop instruction master signal") (i.e., it may be possible to prevent interference).

However, an abnormality may have occurred in the power supply line that connects the power supply unit 85 and the servomotor driver 80 that has detected an abnormality in the power supply voltage. It is necessary to deal with such a situation while the servomotor driver 80 that has detected an abnormality in the power supply voltage is operable. Specifically, the transfer controller 55 must supply an appropriate motor instruction for preventing interference to the servomotor driver 80 before the stop instruction master signal is output.

When the transfer controller 55 has determined that an abnormality in the master signal has occurred, the transfer controller 55 can notify the master controller 60 that an abnormality in the master signal has occurred. However, an abnormality may have occurred in a line through which the master signal output from the master controller 60 is transmitted to the transfer controller 55. In such a case, it may be impossible to receive the stop instruction master signal.

Specifically, the transfer controller 55 must supply an appropriate motor instruction that stops the servo transfer device 30 so that interference does not occur even if the stop instruction master signal is not received taking account of a situation in which an abnormality in the master signal has occurred.

Figure 2:
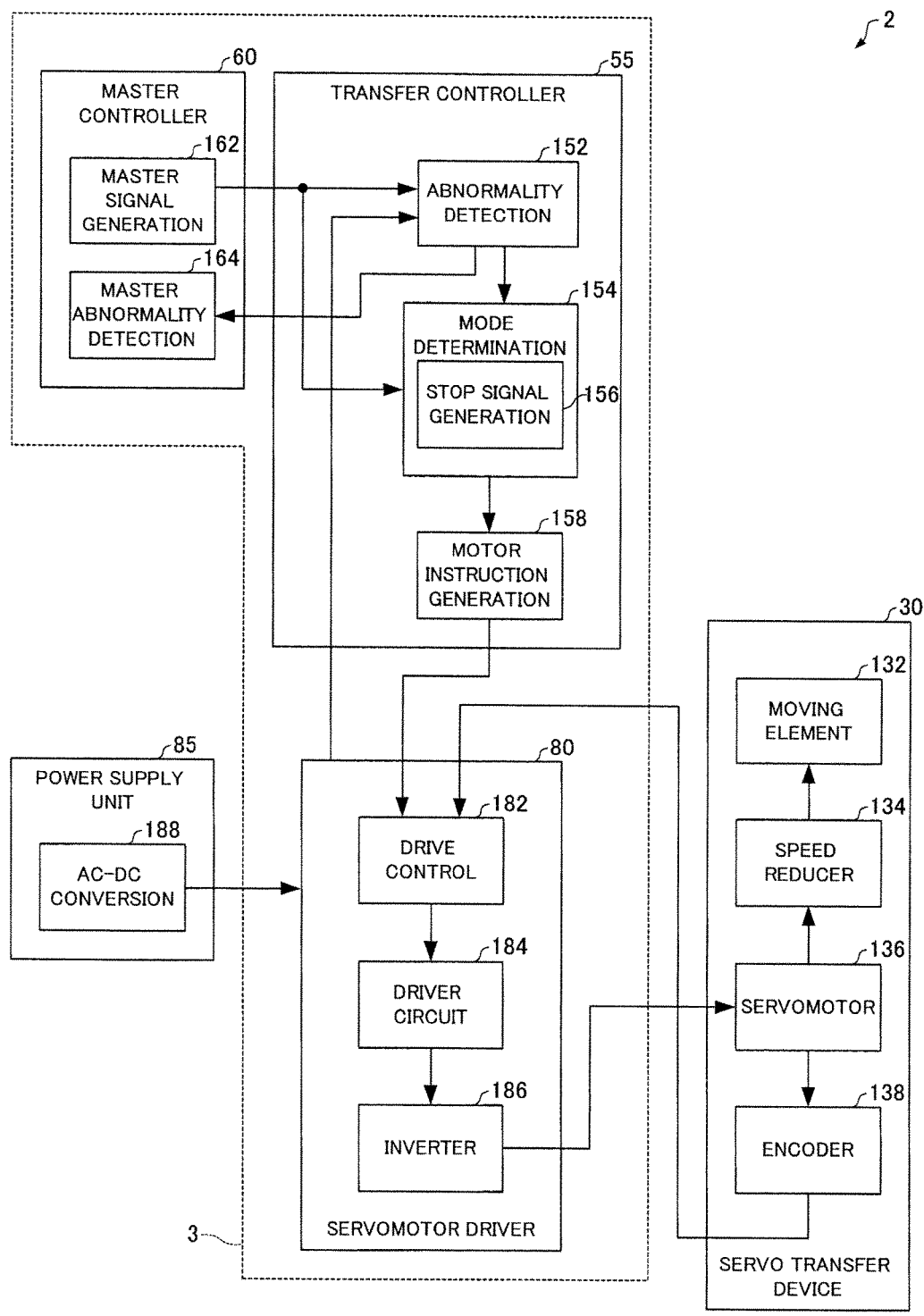
FIG. 2 is a block diagram illustrating an operation control device for a servo press line.

The operation control device 3 according to one embodiment of the invention is configured as illustrated in FIG. 2, and can supply an appropriate motor instruction that stops the servo transfer device 30 so that interference does not occur even if the stop instruction master signal is not received.

FIG. 2 is a block diagram illustrating the operation control device 3 according to one embodiment of the invention. The operation control device 3 includes the master controller 60, the transfer controller 55, and the servomotor driver 80. Note that FIG. 2 illustrates only the part 2 of the servo press line 1 illustrated in FIG. 1. The operation control device 3 includes n+1 transfer controllers 55, and each transfer controller 55 supplies the motor instruction to m servomotor drivers 80. FIG. 2 illustrates one transfer controller 55 and one servomotor driver 80 for convenience of explanation and illustration. The operation control device 3 may include n press controllers 25. In one embodiment of the invention, the press controller 25 is controlled based on the master signal, and illustration and explanation of the press controller 25 are omitted.

The master controller 60 includes a master signal generation section 162 and a master abnormality detection section 164. The master signal generation section 162 generates the master signal, and outputs the master signal to the n+1 transfer controllers 55 and the n press controllers 25. When the master abnormality detection section 164 has received an abnormality detection signal from one of the transfer controllers 55, the master abnormality detection section 164 causes the master signal generation section 162 to output the stop instruction master signal. The n transfer controllers 55 other than the transfer controller 55 that has output the abnormality detection signal to the master abnormality detection section 164, and the n press controllers 25 stop operation in synchronization according to the stop instruction master signal.

The transfer controller 55 includes an abnormality detection section 152, a mode determination section 154, and a motor instruction generation section 158. The abnormality detection section 152 receives the master signal, and determines whether or not an abnormality in the master signal has occurred. An abnormality in the master signal may be a change in the master signal that is impossible for the servo transfer device 30 to follow, a change in information or code of the master signal due to an abnormality in the master signal line (path) (e.g., connection failure or disconnection (breakage)), and the like.

The abnormality detection section 152 also determines whether or not an abnormality has occurred in the power supply voltage supplied to each of the m servomotor drivers 80 that output the motor instruction. The power supply unit 85 that includes an AD-DC conversion section 188 (see FIG. 2) supplies a given power supply voltage to the servomotor driver 80. An abnormality in the power supply voltage may be a decrease in voltage due to disconnection (breakage) of a power supply line, a power failure, or the like. An increase in voltage that exceeds an allowable range may also be determined to be an abnormality in the power supply voltage.

The abnormality detection section 152 generates the abnormality detection signal when the abnormality detection section 152 has detected an abnormality in the master signal or an abnormality in the power supply voltage, and outputs the abnormality detection signal to the master abnormality detection section 164 and the mode determination section 154. The abnormality detection section 152 may store the previous master signal that could be followed by the servo transfer device 30 in a memory (not illustrated in FIG. 2), and compare the received master signal with the previous master signal stored in the memory to efficiently detect an abnormality in the master signal.

The mode determination section 154 determines an operation mode, and outputs a signal corresponding to the mode to the motor instruction generation section 158. In one embodiment of the invention, the mode determination section 154 sets the operation mode to a first mode during a normal operation (i.e., when an abnormality in the master signal and an abnormality in the power supply voltage have not been detected). The mode determination section 154 sets the operation mode to a second mode when an abnormality in the master signal has been detected. The mode determination section 154 sets the operation mode to a third mode when an abnormality in the power supply voltage has been detected.

The mode determination section 154 outputs the master signal to the motor instruction generation section 158 when the operation mode is set to the first mode. The mode determination section 154 outputs a stop signal generated by the stop signal generation section 156 to the motor instruction generation section 158 instead of the master signal when the operation mode is set to the second mode. The mode determination section 154 outputs a signal that indicates that the operation mode is set to the third mode, and a signal that indicates the operation state of the servo transfer device 30 to the motor instruction generation section 158 when the operation mode is set to the third mode.

The stop signal generation section 156 generates the stop signal that stops the servo transfer device 30 at a timing earlier or later than the timing designated by the stop instruction master signal. The stop signal generation section 156 may generate the stop signal when the operation mode has changed from the first mode to the second mode. In one embodiment of the invention, a plurality of stop signals are provided. The mode determination section 154 selects an appropriate stop signal corresponding to the operation state of the servo transfer device 30. The stop signal selection process is described later. The mode determination section 154 can determine the operation state based on a signal from an encoder 138 included in the servo transfer device 30. In FIG. 2, a path that connects the mode determination section 154 and the encoder 138 is omitted.

The motor instruction generation section 158 generates the motor instruction based on the received master signal, stop signal, or the like, and outputs the motor instruction to the servomotor driver 80. When the motor instruction generation section 158 has received the master signal or the stop signal, the motor instruction generation section 158 generates the motor instruction that designates a temporal change in strokes per minute based on the master signal or the stop signal. The mode determination section 154 generates the motor instruction that designates only the stop time based on the signal that indicates the operation state of the servo transfer device 30 when the operation mode is set to the third mode.

The transfer controller 55 generates the motor instruction independently of the master signal when the operation mode is set to the second mode or the third mode (i.e., when an abnormality has been detected). Specifically, the transfer controller 55 can stop the servo transfer device 30 without receiving an instruction from the master controller 60 when an abnormality has been detected. Therefore, it is possible to stop the servo transfer device 30 even when an abnormality in the master signal has occurred.

A capacitor (not illustrated in FIG. 2) for operating the servomotor driver 80 and the servomotor 136 of the servo transfer device 30 when a power failure or the like has occurred is normally provided. However, it is difficult to provide a large-capacity capacitor taking account of an increase in cost and device size, and a small-capacity capacitor for implementing only a stop operation when a power failure has occurred is normally provided. The transfer controller 55 can stop the servo transfer device 30 instead of the master controller 60. Therefore, it is unnecessary to wait for the stop instruction master signal, and it is possible to stop the servo transfer device 30 so that interference does not occur before the capacitor is fully discharged.

The servomotor driver 80 that receives the motor instruction from the transfer controller 55 includes a drive control section 182, a driver circuit 184, and an inverter 186. The drive control section 182 receives the motor instruction, and also receives a signal that indicates the rotation angle of the servomotor 136 of the servo transfer device 30 from the encoder 138. The drive control section 182 outputs the motor instruction that has been adjusted based on the rotation angle of the servomotor 136 to the driver circuit 184.

The driver circuit 184 outputs a control signal (direct-current signal) that rotates or stops the servomotor 136 to the inverter 186 based on the adjusted motor instruction. The inverter 186 converts the direct-current signal into an alternating-current signal, and outputs the alternating-current signal to the servomotor 136.

The servo transfer device 30 is configured so that the rotation of the servomotor 136 is reduced in speed by a speed reducer 134 (e.g., gear), and transmitted to a moving element 132 to transfer the workpiece 35 to or from the servo press 10. The servo transfer device 30 includes the encoder 138 (sensor) that detects the rotation angle of the servomotor 136.

Figure 3:
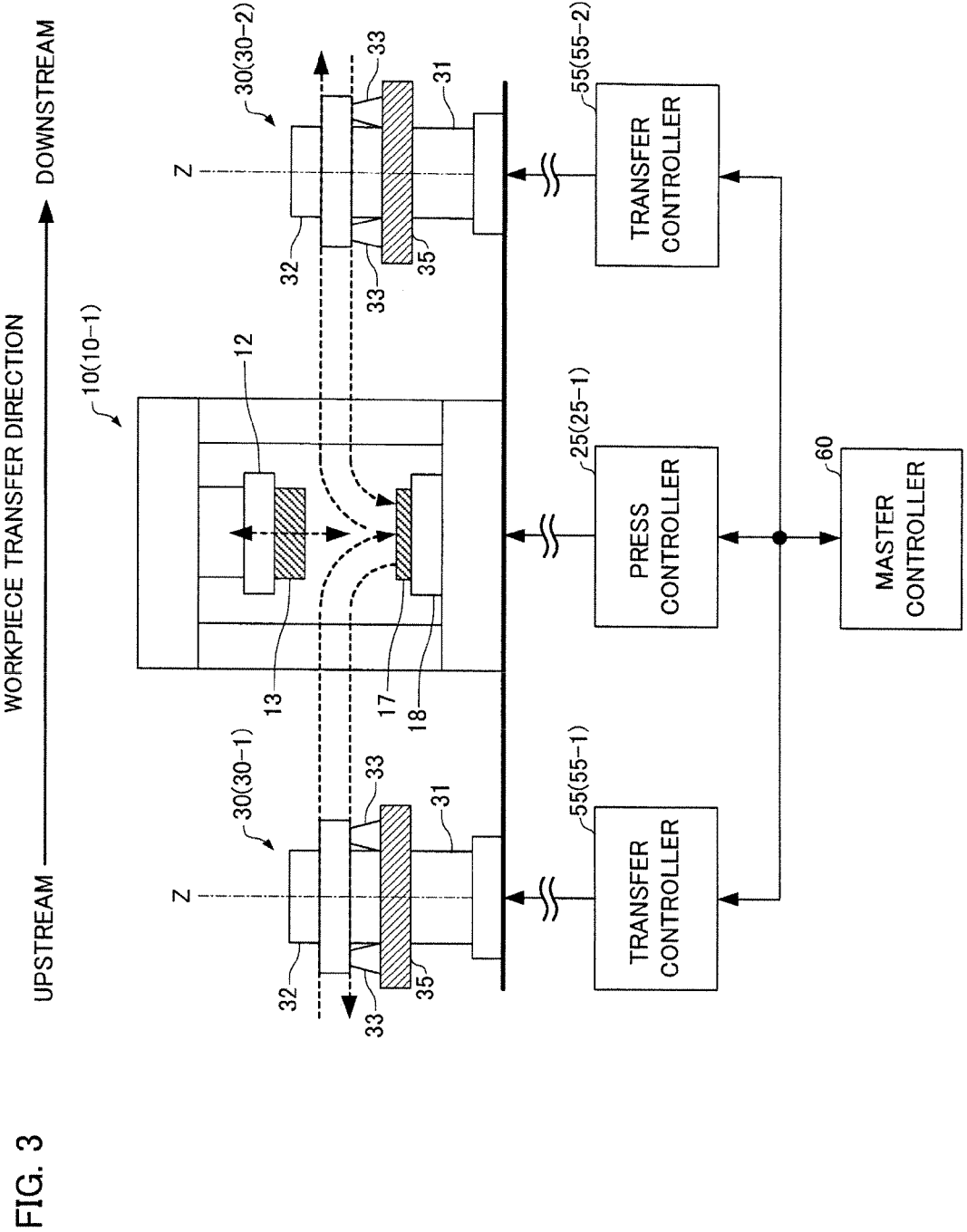
FIG. 3 illustrates the configuration of a servo press and a servo transfer device.

FIG. 3 illustrates the configuration of the servo press 10 and the servo transfer device 30. In FIG. 3, the workpiece 35 is transferred in the direction (hereinafter referred to as "workpiece transfer direction") from left (upstream side) to right (downstream side). The upstream side and the downstream side of the workpiece transfer direction may be hereinafter referred to as "upstream side" and "downstream side", respectively.

The configuration illustrated in FIG. 3 corresponds to the case where one servo press 10 (i.e., n=1) is provided in the servo press line 1 illustrated in FIG. 1. Specifically, the upstream-side servo transfer device 30-1 and the downstream-side servo transfer device 30-2 are disposed on either side of the servo press 10-1. When n is 2 or more, an additional servo press 10 is disposed on the downstream side of the servo transfer device 30-2, and an additional servo transfer device 30 is disposed on the downstream side of the additional servo press 10.

For example, when n is 2, the servo press 10-2 (not illustrated in FIG. 3) is disposed on the downstream side of the servo transfer device 30-2, and the servo transfer device 30-3 (not illustrated in FIG. 3) is disposed on the downstream side of the servo press 10-2. In this case, the servo transfer device 30-2 functions as the downstream-side servo transfer device 3 with respect to the servo press 10-1, and functions as the upstream-side servo transfer device 30 with respect to the servo press 10-2. The servo press line 1 is configured so that n is an arbitrary number. The configuration and the like of the servo press 10 and the servo transfer device 30 are described below taking the configuration illustrated in FIG. 3 (i.e., n=1) as an example for convenience of explanation and illustration. The expressions "upstream side" and "downstream side" are used with respect to the servo press 10-1.

The servo press 10 includes a slide 12, an upper die 13, a lower die 17, a bolster 18, and the like, and can perform a press operation. The servo transfer device 30 includes a main body 31, a carrier 32, and an adsorbing means 33, and can perform a transfer operation.

In FIG. 3, the workpiece 35 to be pressed (i.e., the workpiece 35 not pressed yet or the workpiece 35 already pressed in the upstream-side servo press 10) is transferred to the servo press 10 by the upstream-side servo transfer device 30-1, placed on the lower die 17 included in the servo press 10, and then pressed. The upstream-side servo transfer device 30-1 returns to an intermediate position Z of the servo transfer device 30-1 after the workpiece 35 has been placed on the lower die 17. The workpiece 35 that has been pressed by the servo press 10 is transferred by the downstream-side servo transfer device 30-2 to an intermediate position Z of the servo transfer device 30-2.

In FIG. 3, the motion of the slide 12, the motion of the servo transfer device 30-1, and the motion of the servo transfer device 30-2 are indicated by the dotted lines. The press controller 25-1 controls the motion of the slide 12, the transfer controller 55-1 controls the motion of the servo transfer device 30-1, and the transfer controller 55-2 controls the motion of the servo transfer device 30-2. The press controller 25-1, the transfer controller 55-1, and the transfer controller 55-2 perform the control process based on the master signal output from the master controller 60. Specifically, the position of the slide 12 of the servo press 10, the position of the servo transfer device 30-1, and the position of the servo transfer device 30-2 change in synchronization based on the master signal.

An example of the master signal, the motor instruction, and a change in rotation of the servomotor 136 is described below with reference to FIGS. 4A to 5D. As illustrated in FIG. 4, the master signal according to one embodiment of the invention indicates the instruction angle (0 to 360 (deg)). As illustrated in FIG. 4, the instruction angle indicated by the master signal is 0 (deg) at a time ta, linearly changes up to 360 (deg), and returns to 0 (deg) at a time tb at which 360 (deg) has been reached. Specifically, the instruction angle indicated by the master signal repeatedly changes within the range of 0 to 360 (deg) in the cycle "tb-ta" during a normal operation.

The motor instruction generation section 158 generates the motor instruction based on the master signal during a normal operation (i.e., when an abnormality in the master signal and an abnormality in the power supply voltage have not been detected). In this case, the strokes per minute designated by the motor instruction are 100% (see FIG. 4B), and the servomotor driver 80 controls the servomotor 136 so that the servo transfer device 30 makes a normal motion.

Figure 4A:
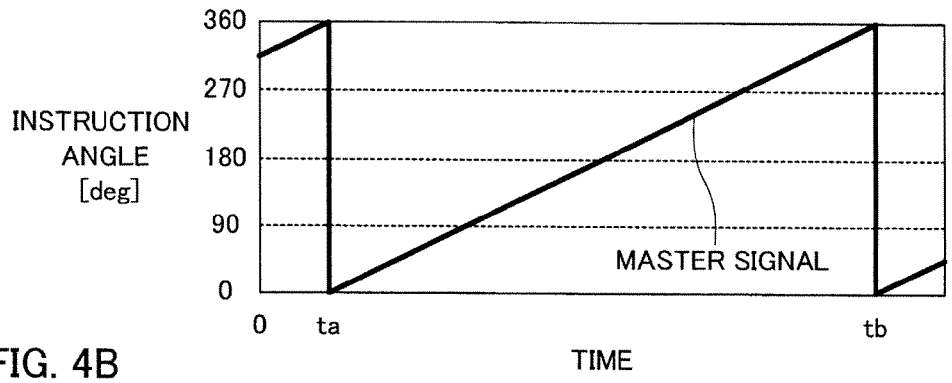
FIG. 4A is a graph illustrating an example of a master signal.
Figure 4B:
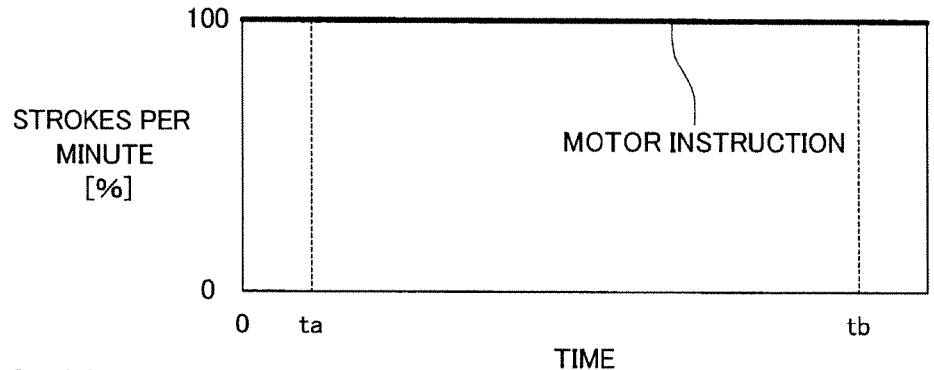
FIG. 4B is a graph illustrating an example of a motor instruction.
Figure 4C:
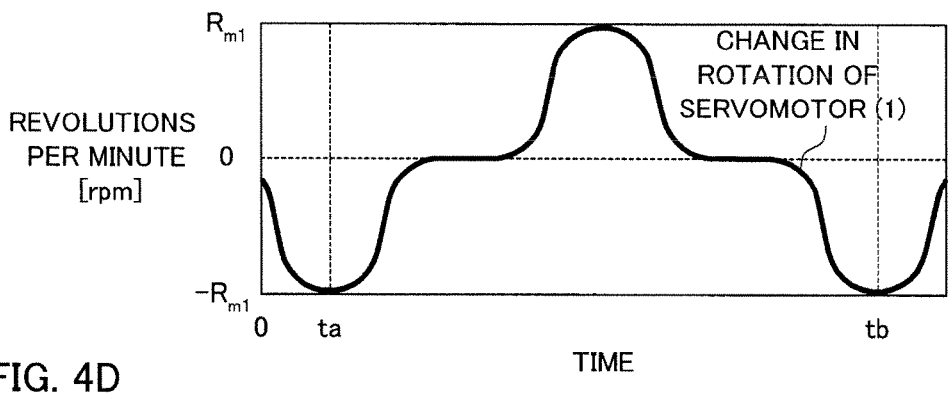
FIG. 4C is a graph illustrating an example of a change in rotation of a servomotor.
Figure 4D:
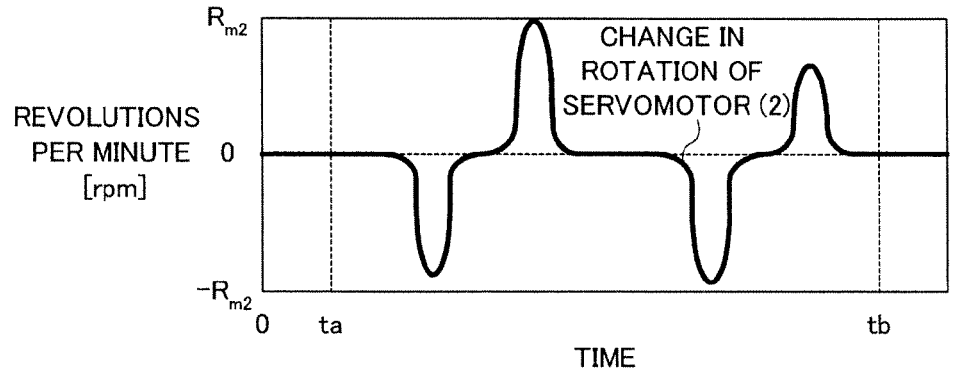
FIG. 4D is a graph illustrating an example of a change in rotation of another servomotor.

For example, one servomotor 136 changes in rotation within the range of $-R_{m1}$ (rpm) to $+R_{m1}$ (rpm) (see FIG. 4C), and another servomotor 136 changes in rotation within the range of $-R_{m2}$ (rpm) to $+R_{m2}$ (rpm) (see FIG. 4D). The rotation of the servomotor 136 repeatedly changes in synchronization with the master signal in the cycle "tb–ta".

The series of operations described above with reference to FIG. 3 is implemented by the change in rotation of the servomotor 136. Specifically, the upstream-side servo transfer device 30-1 transfers the workpiece 35 to the servo press 10, the servo press 10 presses the workpiece 35, and the downstream-side servo transfer device 30-2 transfers the pressed workpiece 35 from the servo press 10.

Figure 5A:
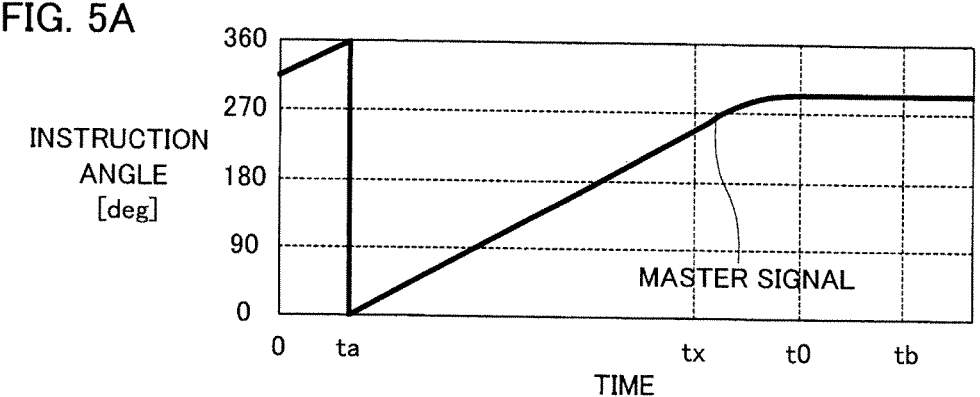
FIG. 5A is a graph illustrating another example of a master signal.

When the master abnormality detection section 164 has received the abnormality detection signal at a time tx, the master signal generation section 162 generates the stop instruction master signal (master signal) that stops the servo transfer device 30 and the servo press 10, and outputs the stop instruction master signal. FIG. 5A is a graph illustrating the master signal that stops the servo transfer device 30 and the servo press 10 at a time t0. The master signal generation section 162 continuously outputs the stop instruction master signal from the time tx. As illustrated in FIG. 5A, the master signal nonlinearly changes from the time tx to the time t0, and does not change after the time t0.

Figure 5B:
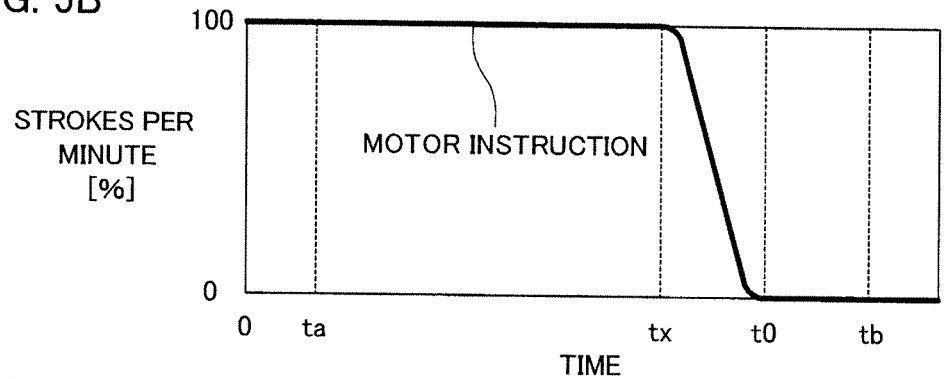
FIG. 5B is a graph illustrating another example of a motor instruction.

FIG. 5B illustrates the strokes per minute designated by the motor instruction that changes corresponding to the master signal illustrated in FIG. 5A. The strokes per minute decrease after the time tx, and are set to 0 after the time t0.

Figure 5C:
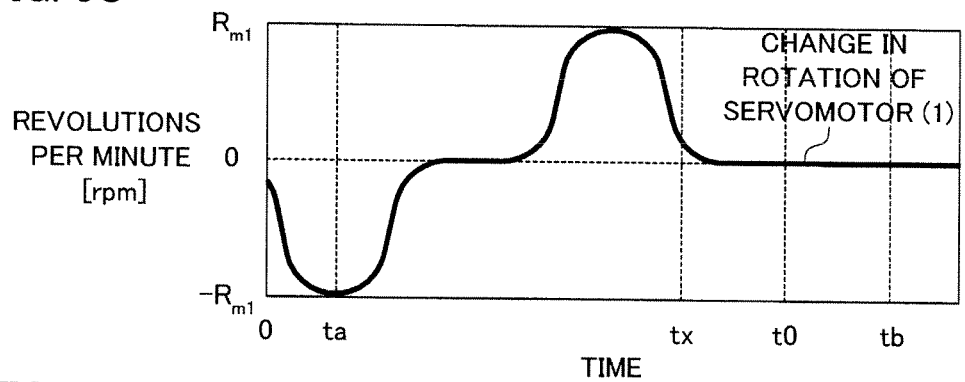
FIG. 5C is a graph illustrating another example of a change in rotation of a servomotor.
Figure 5D:
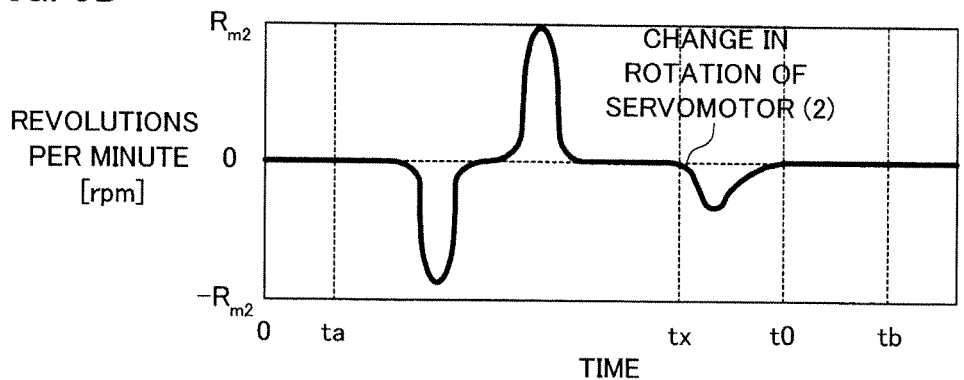
FIG. 5D is a graph illustrating another example of a change in rotation of another servomotor.

FIGS. 5C and 5D illustrate examples of a change in rotation of different servomotors 136. As illustrated in FIGS. 5C and 5D, the servomotors 136 are stopped at the time t0. Note that FIG. 5C corresponds to FIG. 4C, and FIG. 5D corresponds to FIG. 4D.

Specifically, when the master abnormality detection section 164 has received the abnormality detection signal at the time tx, the servo transfer device 30 and the servo press 10 that operate according to the stop instruction master signal make a synchronized motion, and stop at the time t0. However, the transfer controller 55 that has output the abnormality detection signal to the master abnormality detection section 164 must stop the servo transfer device 30 independently of the stop instruction master signal taking account of a situation in which an abnormality in the master signal has occurred. In this case, the transfer controller 55 must supply an appropriate motor instruction so that interference does not occur.

The transfer controller 55 outputs the stop signal generated by the stop signal generation section 156 to the motor instruction generation section 158 instead of the master signal when the operation mode is set to the second mode (i.e., when an abnormality in the master signal has been detected). The motor instruction generation section 158 generates the motor instruction based on the stop signal. Therefore, the transfer controller 55 can stop the servo transfer device 30 so that interference does not occur by generating an appropriate stop signal.

An example in which interference occurs (see FIGS. 6 to 8), and an appropriate stop signal generated by the transfer controller 55 (see FIGS. 9A and 9B) are described below. Note that the servo transfer device 30 and the servo press 10 are synchronized even after the stop signal has been received, and make a predetermined motion until they stop.

Figure 6:
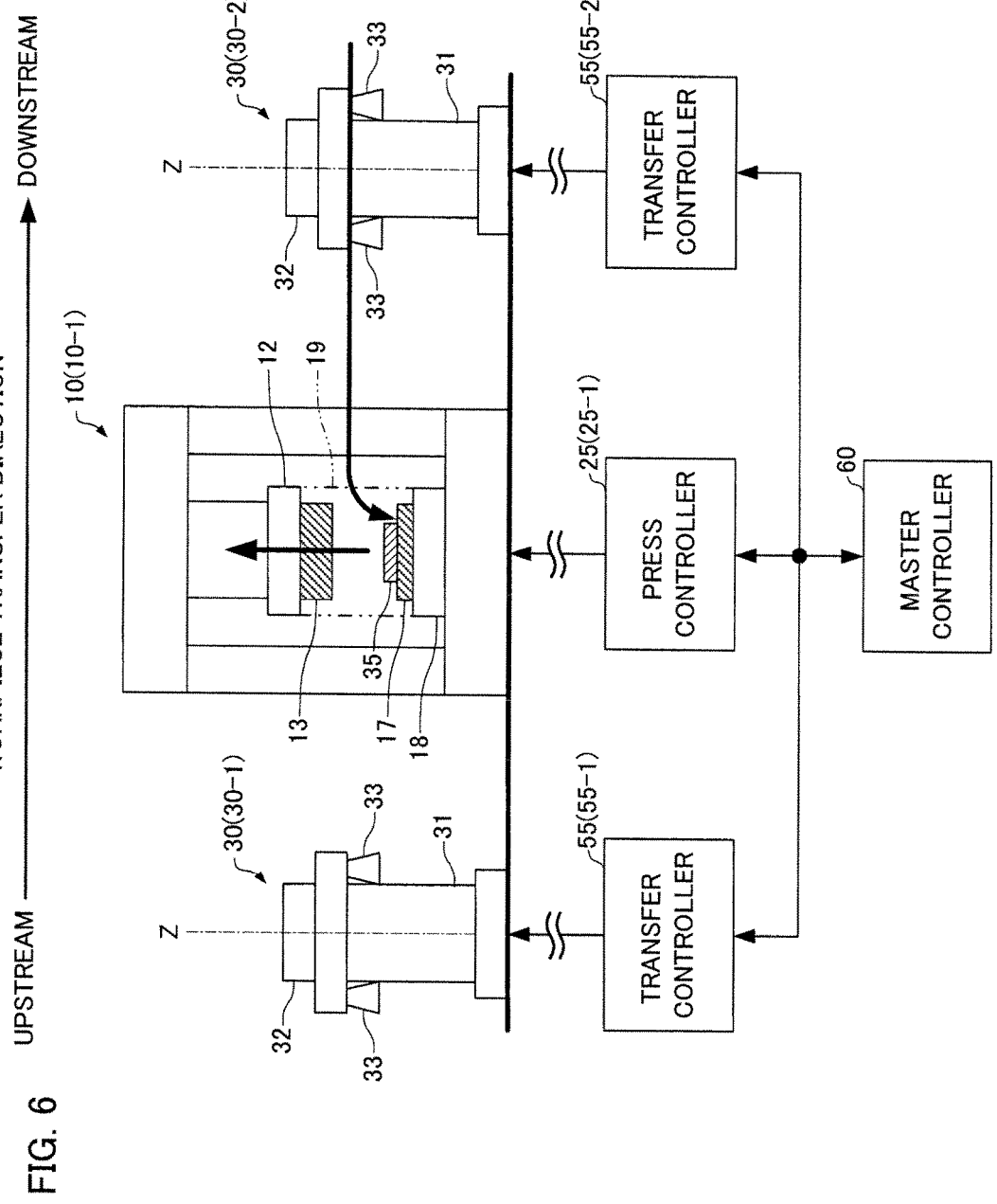
FIG. 6 illustrates the motion of a servo transfer device using the relationship with an interference area.

FIG. 6 illustrates the motion of the downstream-side servo transfer device 30-2 using the relationship with a press area 19. Note that the same elements as those illustrated in FIG. 3 are indicated by the same reference signs, and description thereof is omitted.

As illustrated in FIG. 6, the downstream-side servo transfer device 30-2 make motion so as to enter the press area 19 in order to transfer the pressed workpiece 35 from the servo press 10. The press area 19 is an interference area of the servo transfer device 30 and the servo press 10. In FIG. 6, the slide 12 moves upward, and the upstream-side servo transfer device 30-1 is situated away from the press area 19. Therefore, only interference between the downstream-side servo transfer device 30-2 and the slide 12 is taken into account.

When the downstream-side servo transfer device 30-2 makes the motion illustrated in FIG. 6 (i.e., when the downstream-side servo transfer device 30-2 is moving in a direction to enter the press area 19), interference can be prevented more reliably by decreasing the stop time of the downstream-side servo transfer device 30-2 so that the downstream-side servo transfer device 30-2 does not move in a direction to enter the press area 19 after the slide 12 has stopped. That is, the motor of the downstream-side servo transfer device 30-2 is stopped by the transfer controller 55 prior to a halt in an ascent of the slide 12, when the downstream-side servo transfer device 30-2 gets close to the servo press 10 to pick up the pressed workpiece 35 and the slide 12 gets away from the pressed workpiece 35, in order to prevent the interference more reliably. Therefore, the stop signal may be set so that the stop time decreases when the downstream-side servo transfer device 30-2 is moving in a direction to enter the press area 19.

As illustrated in FIG. 6, the press area 19 may be an inner area of the servo press 10 that is defined by a virtual line that extends from the edge of the slide 12 and is orthogonal to the workpiece transfer direction, the lower side of the slide 12, and the upper side of the bolster 18. Note that the area in the workpiece transfer direction may be decreased or increased corresponding to the height of the path of the servo transfer device 30. A case where the path of the servo transfer device 30 is high means that the path of the servo transfer device 30 is closer to the slide 12 than the bolster 18, and a case where the path of the servo transfer device 30 is low means that the path of the servo transfer device 30 is closer to the bolster 18 than the slide 12.

Figure 7:
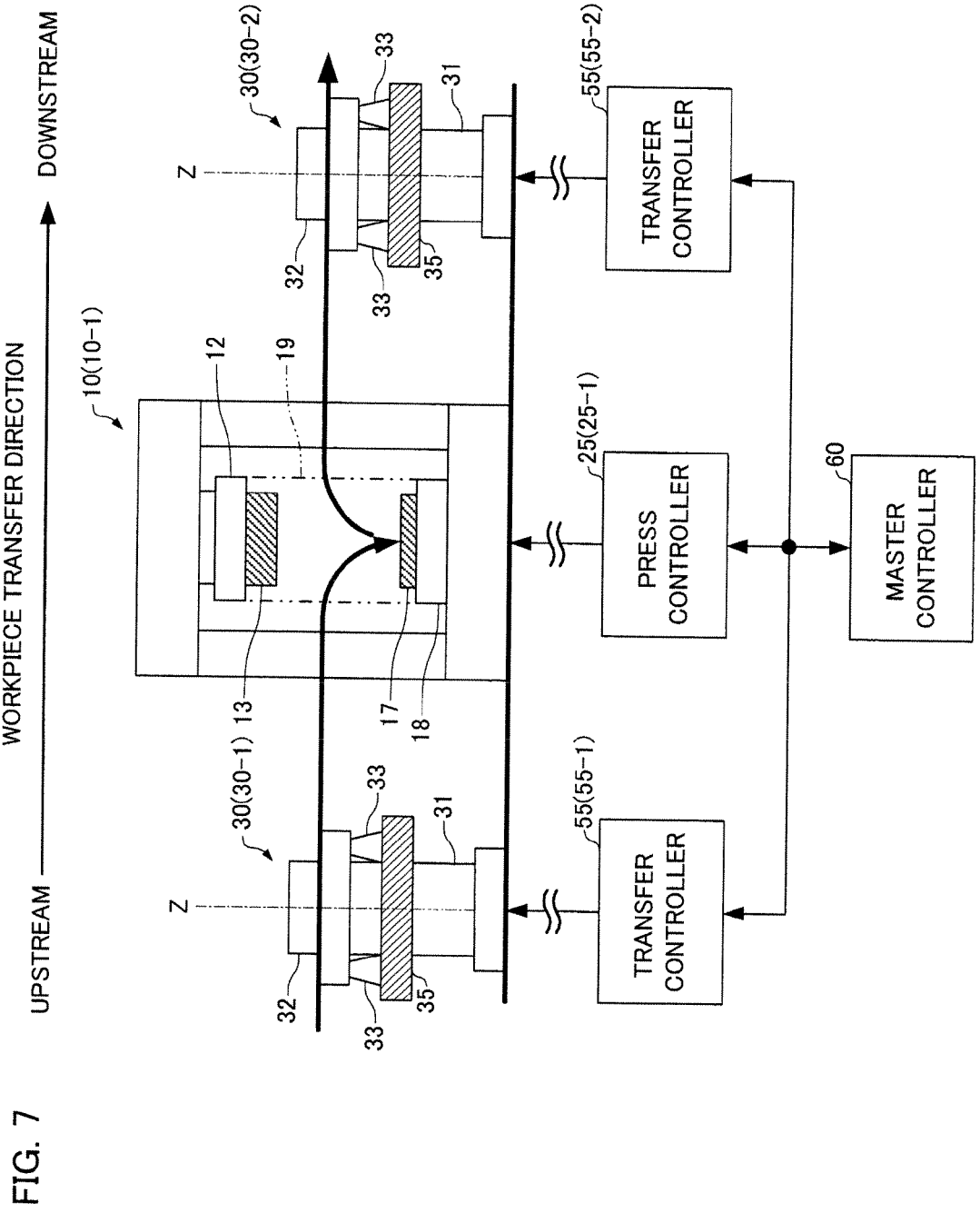
FIG. 7 illustrates another motion of a servo transfer device using the relationship with an interference area.

FIG. 7 illustrates the motion of the upstream-side servo transfer device 30-1 and the motion of the downstream-side servo transfer device 30-2 using the relationship with the press area 19. Note that the same elements as those illustrated in FIGS. 3 and 6 are indicated by the same reference signs, and description thereof is omitted.

As illustrated in FIG. 7, the downstream-side servo transfer device 30-2 transfers the pressed workpiece 35 from the servo press 10. The upstream-side servo transfer device 30-1 transfers the next workpiece 35 to the servo press 10. Specifically, the downstream-side servo transfer device 30-2 makes a motion so as to withdraw from the press area 19, and the upstream-side servo transfer device 30-1 makes a motion so as to enter the press area 19. In this case, the slide 12 is situated at a sufficiently high position at which the slide 12 does not interfere with the servo transfer device 30-1 and the servo transfer device 30-2. Therefore, only interference between the upstream-side servo transfer device 30-1 and the downstream-side servo transfer device 30-2 in the press area 19 is taken into account.

It is necessary to prevent a situation in which the upstream-side servo transfer device 30-1 collides with the downstream-side servo transfer device 30-2 present in the press area 19. Therefore, the stop time may be decreased so that the upstream-side servo transfer device 30-1 does not move in a direction to enter the press area 19 after the downstream-side servo transfer device 30-2 has stopped. That is, the motor of the upstream-side servo transfer device 30-1 is stopped by the transfer controller 55 prior to a halt of the motor of the downstream-side servo transfer device 30-2, when the upstream-side servo transfer device 30-1 gets close to the servo press 10 to put the next workpiece 35 to be pressed into the servo press 10 and the downstream-side servo transfer device 30-2 gets away from the servo press 10 with the pressed workpiece 35. It is also necessary to prevent a situation in which the downstream-side servo transfer device 30-2 collides with the upstream-side servo transfer device 30-1 that makes a motion so as to enter the press area 19. Therefore, the stop time may be increased so that the downstream-side servo transfer device 30-2 does not stop before the upstream-side servo transfer device 30-1 stops, and is moving in a direction to withdraw from the press area 19 after the upstream-side servo transfer device 30-1 has stopped.

Therefore, the stop signal may be set so that the stop time decreases when the upstream-side servo transfer device 30-1 is moving in a direction to enter the press area 19. The stop signal may be set so that the stop time increases when the downstream-side servo transfer device 30-2 is moving in a direction to withdraw from the press area 19.

Figure 8:
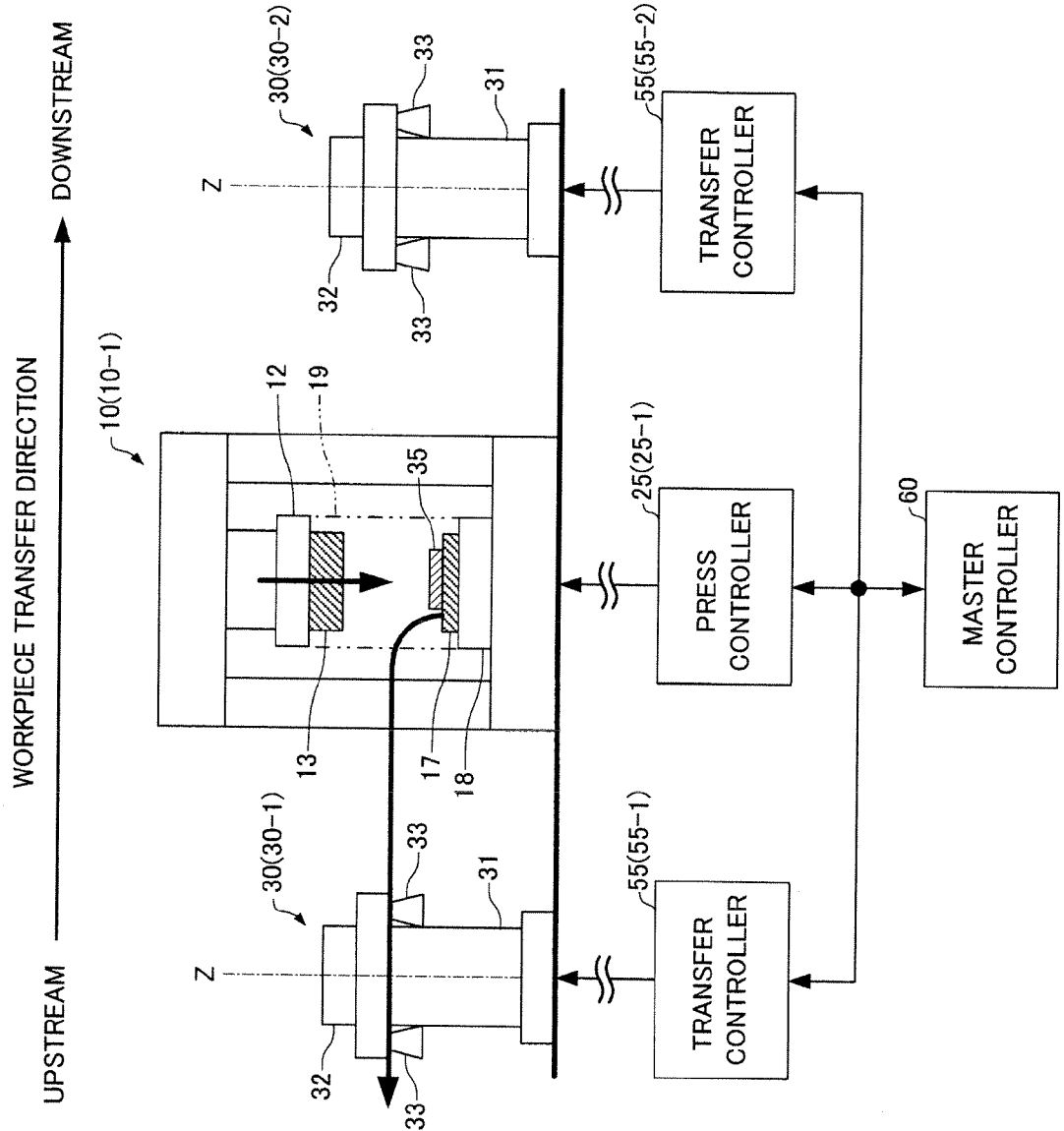
FIG. 8 illustrates yet another motion of a servo transfer device using the relationship with an interference area.

FIG. 8 illustrates the motion of the upstream-side servo transfer device 30-1 using the relationship with the press area 19. Note that the same elements as those illustrated in FIGS. 3, 6, and 7 are indicated by the same reference signs, and description thereof is omitted.

As illustrated in FIG. 8, the upstream-side servo transfer device 30-1 places the next workpiece 35 on the lower die 17, and makes a motion so as to withdraw from the press area 19. In FIG. 8, the slide 12 moves downward, and the downstream-side servo transfer device 30-2 is situated away from the press area 19. Therefore, only interference between the upstream-side servo transfer device 30-1 and the slide 12 is taken into account.

When the upstream-side servo transfer device 30-1 makes the motion illustrated in FIG. 8 (i.e., when the upstream-side servo transfer device 30-1 is moving in a direction to withdraw from the press area 19), a situation in which the upstream-side servo transfer device 30-1 that is moving in a direction to withdraw from the press area 19 interferes with the slide 12 that moves downward can be prevented more reliably by increasing the stop time so that the upstream-side servo transfer device 30-1 is moving in a direction to withdraw from the press area 19 after the slide 12 has stopped. That is, the slide 12 of the servo press 10 stops prior to a halt of the motor of the upstream-side servo transfer device 30-1, when the slide 12 of the servo press 10 gets close to the next workpiece 35 to be pressed and the upstream-side servo transfer device 30-1 gets away from the next workpiece 35 to be pressed, in order to prevent the collision between the upstream-side servo transfer device 30-1 and the slide 12. Therefore, the stop signal may be set so that the stop time increases when the upstream-side servo transfer device 30-1 is moving in a direction to withdraw from the press area 19.

Accordingly, the transfer controller 55 that has output the abnormality detection signal to the master abnormality detection section 164 may set the stop signal so that the stop time decreases when the servo transfer device 30 is moving in a direction to enter the press area 19, and set the stop signal so that the stop time increases when the upstream-side servo transfer device 30-1 is moving in a direction to withdraw from the press area 19.

While the servo transfer device 30 must be controlled so that interference with the slide 12 does not occur, the servo press 10 follows the stop instruction master signal. Therefore, the transfer controller 55 may decrease the stop time as compared with the stop time designated by the stop instruction master signal when the servo transfer device 30 is moving in a direction to enter the press area 19. The transfer controller 55 may increase the stop time as compared with the stop time designated by the stop instruction master signal when the servo transfer device 30 is moving in a direction to withdraw from the press area 19.

Figure 9A:
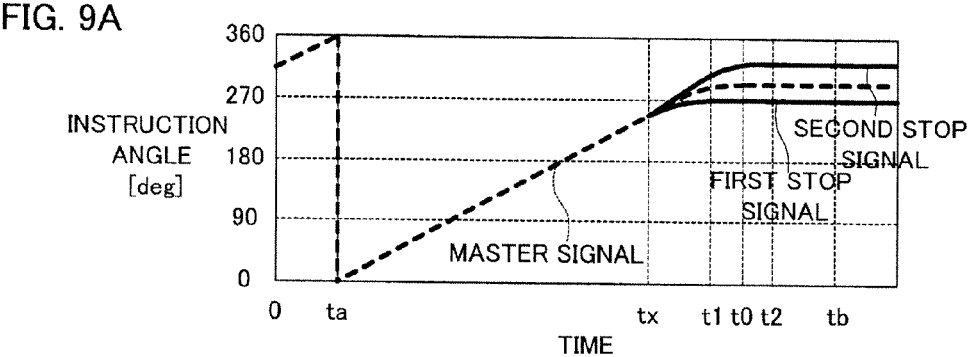
FIG. 9A is a graph illustrating a stop signal.

FIG. 9A is a graph illustrating the stop signal that is used by the transfer controller 55 according to one embodiment of the invention. In FIG. 9A, the master signal illustrated in FIG. 5A (i.e., stop instruction master signal after the time tx) is indicated by the dotted line. Since the servo press 10 follows the stop instruction master signal, the servo press 10 stops at the time to.

The transfer controller 55 that has output the abnormality detection signal to the master abnormality detection section 164 outputs the stop signal generated by the stop signal generation section 156 to the motor instruction generation section 158 instead of the master signal. As illustrated in FIG. 9A, the stop signal generation section 156 generates at least two stop signals (first stop signal and second stop signal). The transfer controller 55 selects one stop signal corresponding to whether or not the servo transfer device 30 is moving in a direction to enter the press area 19.

As illustrated in FIG. 9A, the first stop signal decreases the stop time as compared with the stop time designated by the stop instruction master signal. Specifically, the first stop signal does not change after a time t1 (i.e., a time that is earlier than the time t0), and can stop the servo transfer device 30 at the time t1. As illustrated in FIG. 9A, the second stop signal increase the stop time as compared with the stop time designated by the stop instruction master signal. Specifically, the second stop signal does not change after a time t2 (i.e., a time that is later than the time t0), and can stop the servo transfer device 30 at the time t2.

Figure 9B:
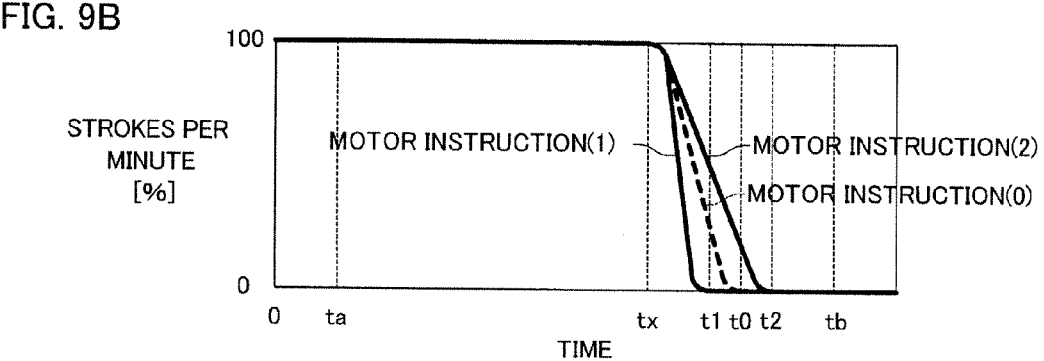
FIG. 9B is a graph illustrating a motor instruction corresponding to a stop signal.

FIG. 9B illustrates a change in strokes per minute designated by the motor instructions that respectively correspond to the master signal, the first stop signal, and the second stop signal. The change in strokes per minute (motor instruction (0) in FIG. 9B) corresponding to the master signal (indicated by the dotted line) is the same as that illustrated in FIG. 5B (i.e., the strokes per minute are set to 0 at the time t0). The strokes per minute (motor instruction (1) in FIG. 9B) corresponding to the first stop signal are set to 0 at the time t1 earlier than the time to. The strokes per minute (motor instruction (2) in FIG. 9B) corresponding to the second stop signal are set to 0 at the time t2 later than the time t0.

Specifically, the transfer controller 55 that has output the abnormality detection signal to the master abnormality detection section 164 selects the first stop signal that can stop the servo transfer device 30 to take a shorter time as compared with the master signal when the servo transfer device 30 that is controlled by the transfer controller 55 using the motor instruction is moving in a direction to enter the press area 19, and generates the motor instruction.

The transfer controller 55 that has output the abnormality detection signal to the master abnormality detection section 164 selects the second stop signal that can stop the servo transfer device 30 to take a longer time as compared with the master signal when the servo transfer device 30 that is controlled by the transfer controller 55 using the motor instruction does not move in a direction to enter the press area 19, and generates the motor instruction.

The transfer controller 55 can reliably prevent interference even when an abnormality in the master signal has occurred, by appropriately selecting the first stop signal or the second stop signal based on the relationship between the servo transfer device 30 and the press area 19 (interference area). As illustrated in FIG. 9A, the first stop signal and the second stop signal differ only in the stop time from the master signal. Therefore, the transfer path of the servo transfer device 30 can be maintained.

Although an example in which two stop signals are provided has been described above, three stop signals may be provided, and the transfer controller 55 may select an appropriate stop signal corresponding to whether or not the servo transfer device 30 is moving in a direction to enter the press area 19, and the distance between the servo transfer device 30 and the press area 19.

The transfer controller 55 according to one embodiment of the invention is configured so that the abnormality detection section 152 can detect an abnormality in the power supply voltage of the servomotor driver 80. For example, the transfer controller 55 can detect a decrease in voltage due to disconnection (breakage) of the power supply line, a power failure, or the like, and can stop the servo transfer device 30 so that interference does not occur while the servomotor driver 80 and the servomotor 136 are operable.

However, it is necessary to stop the servo transfer device 30 so that interference does not occur before the small-capacity capacitor for operating the servomotor driver 80 and the servomotor 136 is fully discharged, differing from the case where an abnormality in the master signal has occurred (i.e., second mode). Therefore, when an abnormality in the power supply voltage has been detected (i.e., third mode), the transfer controller 55 designates only the stop time to the servomotor driver 80 using the motor instruction.

The stop time designated in the third mode is shorter or longer than the stop time designated by the stop instruction master signal. The stop time shorter than the stop time designated by the stop instruction master signal or the stop time longer than the stop time designated by the stop instruction master signal is selected corresponding to whether or not the servo transfer device 30 is moving in a direction to enter the press area 19 in the same manner as in the second mode.

However, when the transfer controller 55 designates only the stop time to the servomotor driver 80, the transfer path of the servo transfer device 30 cannot be maintained. As a result, the possibility that interference occurs increases as compared with the second mode. Therefore, it is preferable to use the second mode as long as it is possible to deal with an abnormality, and carefully switch the operation mode to the third mode.

Figure 10:
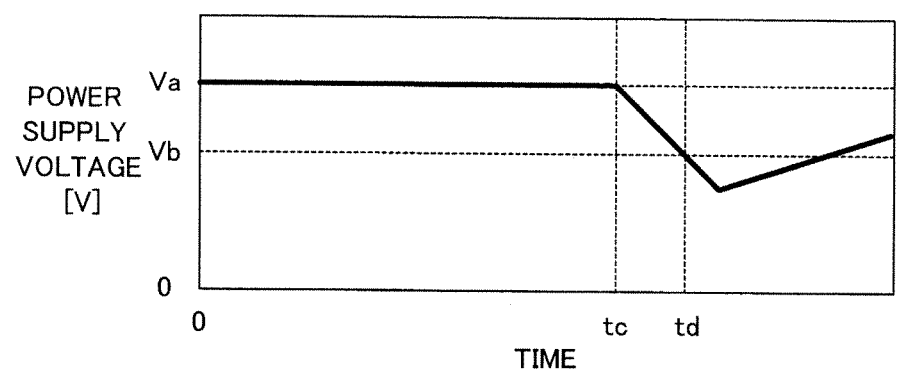
FIG. 10 is a graph illustrating a change in power supply voltage and a mode switch timing.

FIG. 10 is a graph illustrating a change in the power supply voltage, and a timing at which the operation mode is switched to the third mode. The servomotor driver 80 performs a normal operation when the power supply voltage is Va. In FIG. 10, the power supply voltage starts to decrease at a time tc. However, the transfer controller 55 does not switch the operation mode to the third mode at the time tc. The transfer controller 55 switches the operation mode to the third mode at a time td at which the power supply voltage has decreased to Vb. The voltage Vb may be determined based on the voltage Va. For example, the voltage Vb may be 90% of the voltage Va.

Figure 11:
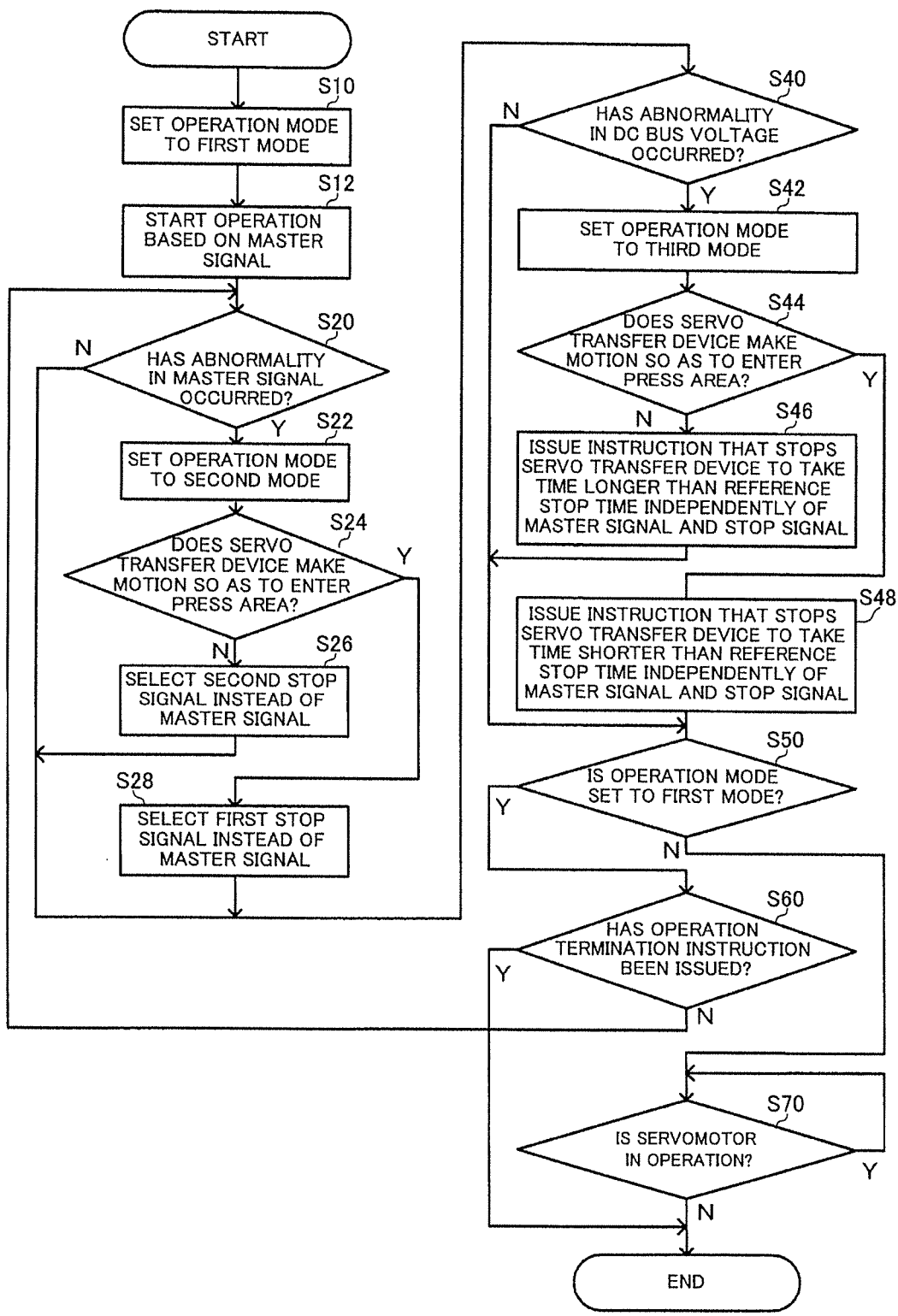
FIG. 11 is a flowchart illustrating an operation method according to one embodiment of the invention.

FIG. 11 is a flowchart illustrating the operation method implemented by the operation control device 3 according to one embodiment of the invention. The transfer controller 55 sets the operation mode to the first mode corresponding to a normal operation (S10). The transfer controller 55 receives the master signal from the master controller 60, and the servo press line 1 starts a normal operation (production operation) (S12).

The transfer controller 55 determines whether or not an abnormality in the master signal has occurred (S20). When the transfer controller 55 has determined that an abnormality in the master signal has occurred (Y in S20), the transfer controller 55 sets the operation mode to the second mode (S22). The transfer controller 55 then 20 determines whether or not the servo transfer device 30 is moving in a direction to enter the press area 19 (S24).

When the transfer controller 55 has determined that the servo transfer device 30 that is controlled by the transfer controller 55 using the motor instruction is moving in a direction to enter the press area 19 (Y in S24), the transfer controller 55 selects the first stop signal that stops the servo transfer device 30 to take a shorter time as compared with the master signal, and generates the motor instruction (S28). When the transfer controller 55 has determined that the servo transfer device 30 that is controlled by the transfer controller 55 using the motor instruction does not move in a direction to enter the press area 19 (N in S24), the transfer controller 55 selects the second stop signal that stops the servo transfer device 30 to take a longer time as compared with the master signal, and generates the motor instruction (S26).

The transfer controller 55 determines whether or not an abnormality in the DC bus voltage has occurred (S40) after the transfer controller 55 has selected the first stop signal or the second stop signal (S26 or S28), or when the transfer controller 55 has determined that the master signal is normal (N in S20).

When the transfer controller 55 has determined that an abnormality in the DC 10 bus voltage has occurred (Y in S40), the transfer controller 55 sets the operation mode to the third mode (S42). The transfer controller 55 then determines whether or not the servo transfer device 30 is moving in a direction to enter the press area 19 (S44).

When the transfer controller 55 has determined that the servo transfer device 30 that is controlled by the transfer controller 55 using the motor instruction is moving in a direction to enter the press area 19 (Y in S44), the transfer controller 55 issues an instruction that stops the servo transfer device 30 to take a shorter time as compared with the stop time (reference stop time) designated by the stop instruction master signal (S48). Specifically, the transfer controller 55 generates the motor instruction that designates a stop time shorter than the reference stop time independently of the master signal, the first stop signal, and the second stop signal.

When the transfer controller 55 has determined that the servo transfer device 30 that is controlled by the transfer controller 55 using the motor instruction does not move in a direction to enter the press area 19 (N in S44), the transfer controller 55 issues an instruction that stops the servo transfer device 30 to take a longer time as compared with the stop time (reference stop time) designated by the stop instruction master signal (S46). Specifically, the transfer controller 55 generates the motor instruction that designates a stop time longer than the reference stop time independently of the master signal, the first stop signal, and the second stop signal.

The transfer controller 55 determines whether or not the operation mode is set to the first mode (S50) after the transfer controller 55 has generated the motor instruction that designates a stop time shorter or longer than the reference stop time in the third 5 mode (S46 or S48), or when the transfer controller 55 has determined that the DC bus voltage is normal (N in S40).

When the transfer controller 55 has determined that the operation mode is set to the first mode (normal operation) (Y in S50), the transfer controller 55 determines whether or not an operation termination instruction has been issued (S60). When the transfer controller 55 has determined that the operation termination instruction has been issued (Y in S60), the transfer controller 55 terminates the process. When the transfer controller 55 has determined that the operation termination instruction has not been issued (N in S60), the transfer controller 55 repeats the process from the step S20.

When the transfer controller 55 has determined that the operation mode is set to the second mode or the third mode (i.e., when an abnormality has been detected) (N in S50), the transfer controller 55 checks whether or not the servo transfer device 30 that is controlled by the transfer controller 55 using the motor instruction has stopped. Specifically, the transfer controller 55 determines whether or not each servomotor 136 is in operation (S70). The transfer controller 55 stands by when the transfer controller 55 has determined that some of the servomotors 136 are in operation (Y in S70). The transfer controller 55 terminates the process when the transfer controller 55 has determined that no servomotor 136 is in operation.

The operation control device 3 according to one embodiment of the invention can reliably prevent interference even when an abnormality in the master signal has occurred, by performing the above operation method.

The embodiments of the invention are described above. Note that the invention is not limited to the above embodiments. Various modifications and variations are possible without departing from the scope of the invention.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A method for operating a servo press line in which a servo press and a servo transfer device are disposed in a workpiece transfer direction, the method comprising:

causing a transfer controller and a press controller to receive a master signal that causes the servo transfer device to make a motion in synchronization with the servo press, the transfer controller controlling a motor of the servo transfer device using a motor instruction and the press controller controlling a motor of the servo press using a motor instruction;

causing the transfer controller to determine whether or not an abnormality in the master signal has occurred;

causing the transfer controller to generate the motor instruction based on a stop signal that stops the motor of the servo transfer device, instead of the master signal, when the transfer controller has determined that an abnormality in the master signal has occurred;

causing the transfer controller to determine whether or not the servo transfer device is moving in a direction to enter a press area, the press area being an interference area with the servo press, wherein the motor of the servo transfer device stops in a predetermined normal time based on a stop instruction from the master signal, wherein, when the transfer controller has determined that an abnormality in the master signal has occurred, the transfer controller selects one of different types of the stop signals corresponding to a determination result as to whether or not the servo transfer device is moving in a direction to enter the press area, and wherein the transfer controller selects a first stop signal, which stops the motor of the servo transfer device in a predetermined first stop time that is shorter than the predetermined normal time, when the transfer controller has determined that the servo transfer device is moving in a direction to enter the press area.

2. A method for operating a servo press line in which a servo press and a servo transfer device are disposed in a workpiece transfer direction, the method comprising:

causing a transfer controller and a press controller to receive a master signal that causes the servo transfer device to make a motion in synchronization with the servo press, the transfer controller controlling a motor of the servo transfer device using a motor instruction and the press controller controlling a motor of the servo press using a motor instruction;

causing the transfer controller to determine whether or not an abnormality in the master signal has occurred;

causing the transfer controller to generate the motor instruction based on a stop signal that stops the motor of the servo transfer device instead of the master signal, when the transfer controller has determined that an abnormality in the master signal has occurred;

causing the transfer controller to determine whether or not the servo transfer device is moving in a direction to enter a press area, the press area being an interference area with the servo press, wherein the motor of the servo transfer device stops in a predetermined normal time based on a stop instruction from the master signal, wherein, when the transfer controller has determined that an abnormality in the master signal has occurred, the transfer controller selects one of different types of the stop signals corresponding to a determination result as to whether or not the servo transfer device is moving in a direction to enter the press area, and wherein the transfer controller selects a second stop signal, which stops the motor of the servo transfer device in a predetermined second stop time that is longer than the predetermined normal time, when the transfer controller has determined that the servo transfer device does not move in a direction to enter the press area.

3. A method for operating a servo press line in which a servo press and a servo transfer device are disposed in a workpiece transfer direction, the method comprising:

causing a transfer controller and a press controller to receive a master signal that causes the servo transfer device to make a motion in synchronization with the servo press, the transfer controller controlling a motor of the servo transfer device using a motor instruction and the press controller controlling a motor of the servo press using a motor instruction;

causing the transfer controller to determine whether or not an abnormality in the master signal has occurred;

causing the transfer controller to generate the motor instruction based on a stop signal that stops the motor of the servo transfer device, instead of the master signal, when the transfer controller has determined that an abnormality in the master signal has occurred;

causing the transfer controller to determine whether or not the servo transfer device is moving in a direction to enter a press area, the press area being an interference area with the servo press;

causing the transfer controller to determine whether or not an abnormality in power supply voltage has occurred, the power supply voltage being supplied to the servo transfer device; and causing the transfer controller to generate the motor instruction that stops the motor of the servo transfer device in a given time independently of the master signal and the stop signal when the transfer controller has determined that an abnormality in the power supply voltage has occurred, wherein the motor of the servo transfer device stops in a predetermined normal time based on a stop instruction from the master signal, wherein, when the transfer controller has determined that an abnormality in the master signal has occurred, the transfer controller selects one of different types of the stop signals corresponding to a determination result as to whether or not the servo transfer device is moving in a direction to enter the press area, and wherein the transfer controller designates a time that is shorter than a predetermined time required to stop the motor of the servo transfer device using the master signal as the given time when the transfer controller has determined that an abnormality in the power supply voltage has occurred and determined that the servo transfer device is moving in a direction to enter the press area.

4. A method for operating a servo press line in which a servo press and a servo transfer device are disposed in a workpiece transfer direction, the method comprising:

causing a transfer controller and a press controller to receive a master signal that causes the servo transfer device to make a motion in synchronization with the servo press, the transfer controller controlling a motor of the servo transfer device using a motor instruction and the press controller controlling a motor of the servo press using a motor instruction;

causing the transfer controller to determine whether or not an abnormality in the master signal has occurred;

causing the transfer controller to generate the motor instruction based on a stop signal that stops the motor of the servo transfer device, instead of the master signal, when the transfer controller has determined that an abnormality in the master signal has occurred;

causing the transfer controller to determine whether or not the servo transfer device is moving in a direction to enter a press area, the press area being an interference area with the servo press;

causing the transfer controller to determine whether or not an abnormality in power supply voltage has occurred, the power supply voltage being supplied to the servo transfer device; and causing the transfer controller to generate the motor instruction that stops the motor of the servo transfer device in a given time independently of the master signal and the stop signal when the transfer controller has determined that an abnormality in the power supply voltage has occurred, wherein the motor of the servo transfer device stops in a predetermined normal time based on a stop instruction from the master signal, wherein, when the transfer controller has determined that an abnormality in the master signal has occurred, the transfer controller selects one of different types of the stop signals corresponding to a determination result as to whether or not the servo transfer device is moving in a direction to enter the press area, and wherein the transfer controller designates a time that is longer than a predetermined time required to stop the motor of the servo transfer device using the master signal as the given time when the transfer controller has determined that an abnormality in the power supply voltage has occurred and determined that the servo transfer device is not moving in a direction to enter the press area.

* * * * *